June 18, 1968  D. F. SWANSON ET AL  3,388,828
APPARATUS FOR STORING AND PRESERVING PERISHABLE
PLANT AND ANIMAL MATERIALS
Filed Dec. 21, 1965
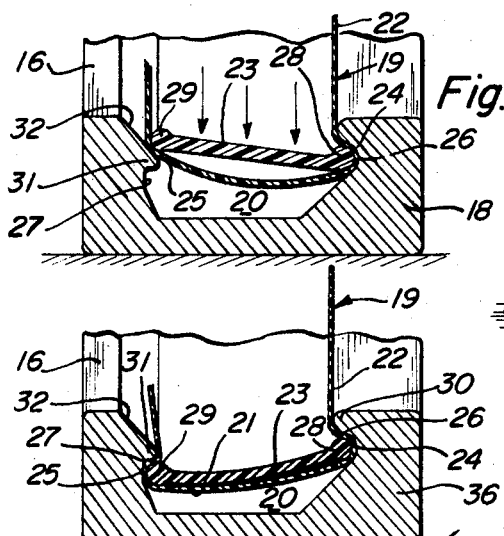
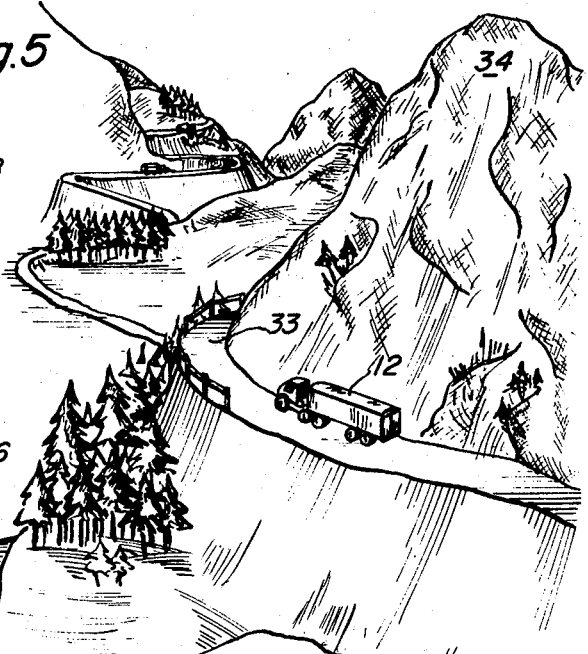
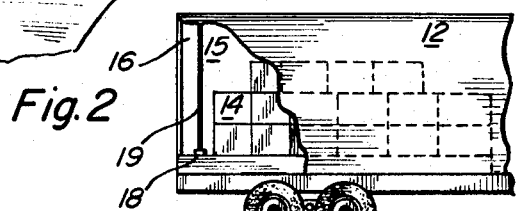
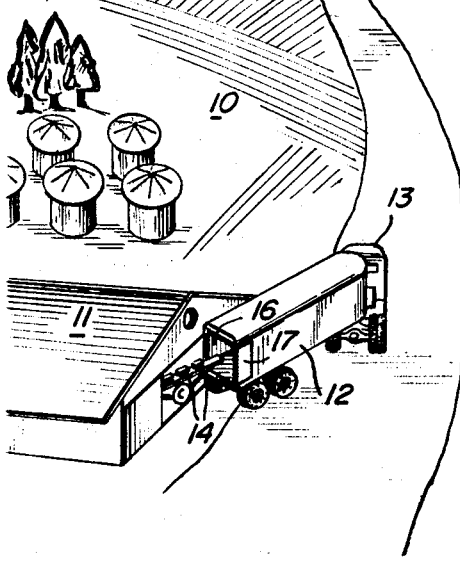
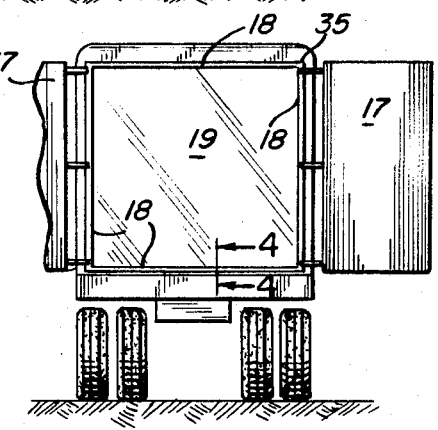
INVENTORS
DONALD F. SWANSON
WYNN G. WINKLER
ATTORNEYS United States Patent Office 3,388,828
Patented June 18, 1968

3,388,828
APPARATUS FOR STORING AND PRESERVING PERISHABLE PLANT AND ANIMAL MATERIALS
Donald F. Swanson and Wynn G. Winkler, St. Paul, Minn., assignors to Whirlpool Corporation, a corporation of Delaware
Filed Dec. 21, 1965, Ser. No. 515,330
2 Claims. (Cl. 220—24)

ABSTRACT OF THE DISCLOSURE

A container having an access opening bounded by a peripheral surface member, a closure means for the opening comprising a flexible sheet material having an opening spanning portion normally extending across the opening and having an edge portion at the peripheral surface member, means forming an elongated recess in a surface of this surface member that is accessible to this opening with the sheet material edge portion being normally located in the recess and an opening spanning portion of the sheet material extending across the opening, an elongated generally flat strip locking means located in the recess expansible laterally for locking the sheet material edge portion at two laterally spaced areas in the recess so as to hold the sheet in position.

---

This invention relates to an apparatus for storing and preserving perishable plant and animal materials such as food materials and relates particularly to a transportable apparatus by means of which the materials can be simultaneously transported and preserved.

It is known that plant and animal materials may be stored for longer periods of time than in air in certain types of atmosphere particularly those that are deficient in oxygen and contain greater than normal air amounts of carbon dioxide. One such atmosphere is described in Bedrosian et al. Patent 3,102,777 assigned to the same assignee as the present application. As is explained in this patent respirating plant and animal materials after being harvested degrade on storage by consuming oxygen and producing carbon dioxide and water. This degrading can be greatly slowed so as to prolong the storage life of the materials by providing them with an atmosphere rich in carbon dioxide and deficient in oxygen.

The apparatus of this invention provides a container providing an enclosing storage atmosphere containing space in which the plant and animal materials are located during storage and particularly during transporting having means forming an access opening that is easily closed by a closure means comprising a flexible sheet material locked in place by novel locking means.

One of the features of this invention is to provide an improved apparatus for storing and preserving perishable plant and animal materials comprising a container, and preferably a transportable container, having a space therein for receiving the plant or animal materials through an access opening together with means including a flexible sheet material for closing the access opening to retain a storage atmosphere in contact with the stored materials together with improved means for fastening the sheet material in position across the access opening.

Other features and advantages of the invention will be apparent from the following description of one embodiment of the invention as disclosed in the accompanying drawings. Of the drawings:

FIGURE 1 is a semi-diagrammatic, fragmentary, perspective view illustrating the transporting of harvested plant and animal materials in enclosed containers under varying conditions of atmospheric pressure.

FIGURE 2 is a fragmentary, side elevational view partially in section of a transportable container, here a semi-trailer, for transporting the harvested material and having the interior sealed by apparatus embodying the invention.

FIGURE 3 is a fragmentary, rear elevational view of the apparatus of FIGURE 2 with the access doors in open position.

FIGURE 4 is an enlarged cross sectional view taken substantially along line 4—4 of FIGURE 3.

FIGURE 5 is a view similar to FIGURE 4 but disclosing an intermediate step in the installation of the sealing means for the storage space.

As is illustrated in FIGURE 1, perishable plant and animal materials such as fruits and vegetables are harvested from fields 10, stored in a warehouse 11 on occasion, and loaded into semi-trailers 12 pulled by tractors 13 when transported to market. The harvested materials 14 which may be in packages such as crates are loaded into the interior 15 of the semi-trailer 12 through an access opening 16 by any means desired. The access opening 16 is normally closed during the transporting by a pair of customary doors 17.

The trailer 12 in this embodiment provides the storage container which here is, of course, transportable. The interior 15 of the trailer provides a space in which the harvested materials 14 are located during the transporting and storage. The access opening 16 to the space 15 is bounded by a peripheral surface member 18 disclosed in enlarged detail in FIGURES 4 and 5 as a metal, such as aluminum, extruded member.

Closure means for the access opening 16 is provided by a flexible sheet material 19 that is substantially fluid impervious in order to retain storage atmosphere such as the above described carbon dioxide rich and oxygen deficient atmosphere. The flexible sheet material 19 is preferably a plastic sheet such as polyethylene film which may be quite thin such as 6–8 mils thickness. As is shown in FIGURE 3, the peripheral surface member such as the aluminum extrusion extends completely around the periphery forming the access opening 16. As is shown in FIGURES 4 and 5, the surface member 18 at the top, bottom and sides of the opening 16 is provided with an elongated recess 20 in a surface of the member 18 that is accessible to the access opening 16.

The sheet material 19 has an edge portion 21 normally located in the recess 20, as shown in FIGURE 4, with the opening spanning portion 22 of the sheet material extending between the surface members 18. Also positioned in the elongated recess 20 is an elongated locking means 23 that is expansible laterally when in this recess for locking the sheet material edge portion 21 against the recess means of surface member 18 at two laterally spaced areas in the recess as shown at 24 and 25.

Because the sheet material 19 as well as the locking means which is in the form of an elongated strip are both of plastic material such as polyethylene or polystyrene they are disposable each time the interior space 15 is opened.

The elongated recess 20 being located in the peripheral surface member 18 extends completely around the access opening 16. The recess is provided with a pair of laterally spaced socket means 26 and 27 into which the locking strip 23 presses the spaced areas 24 and 25 of the sheet edge portion 21 to hold the sheet material in opening spanning position.

The sealing pressure on the spaced areas 24 and 25 is provided by the lateral distortion of the plastic strip 23. This lateral distortion is illustrated by the bent position of the strip in FIGURE 4 which in its unbent or unstressed condition is shown in FIGURE 5.

The plastic strip 23 is provided with enlarged rounded edge beads or bulbous portions 28 and 29 at the side edges for engaging and holding the locked areas 24 and 25 of the sheet material.

As an aid in retaining the sheet material in place, each socket means 26 and 27 is defined on the outer portion by an overhanging shoulder 30 and 31. The shoulder 30 that is adjacent the opening spanning portion 22 of the sheet 19 extends a considerable distance over the corresponding bead 28 so that there will be large surface contact between the sheet material and the shoulder. This provides a very firm frictional grip.

For ease of insertion the opposite shoulder 31 which is outwardly or rearwardly of the shoulder 30 has considerably less width than does the shoulder 30 which requires the relatively large surface contact as explained above. Leading to the shoulder 31 is an inwardly inclined surface means 32 located outwardly of the recess 20 and blending into the surface of the shoulder 31 for providing a mechanical advantage when the edge bead 28 of the plastic strip 23 is placed against its area 24 of the sheet material and both positioned in the corresponding socket means 26 while the other edge bead 29 of the strip 23 is pressed against its sheet material area 25 and moved downwardly over the inclined surface means 32 to its socket means 27 behind its shoulder 31. This method of installing the sheet 19 and its locking means strip 23 is illustrated in FIGURE 5.

The flexible sheet material 19 for retaining the atmosphere within the space 15 during storage and particularly during transporting may be installed either loose or taut as illustrated in the drawings. As is evident from the above description, the sealing sheet is very easy to install as can be noted merely by comparing FIGURE 5 to FIGURE 4. Because both the sheet material and the retainer strip 23 may be made of inexpensive plastic material, as explained, they are disposable so that a fresh portion of sheet material and fresh lengths of sealing strips may be used each time the access opening is sealed.

The peripheral surface member 18 used to hold the edge portions of the sheet 19 may be extruded aluminum as described. It may be readily and permanently attached by ordinary attaching screws (not shown) or the like to the inside of the container such as the trailer and may be left in position even when the trailer is used for normal hauling.

Because the sheet 19 and retainer strip 23 are both flexible the sheet is not displaced even when the trailer is under stress when passing around road curves 33 and over hills and mountains 34.

Because of the low height of the surface member or extrusion 18 there is no interference with loading or unloading of the trailer. Because of the bowed condition of the installed strip 23 and the overhanging retaining shoulders 30 and 31, any stress or pressure on the sealing sheet material 19 merely tightens the seal at the recess 20.

For ease of installation the extrusion 18 is preferably installed in one piece and merely bent to go around corners 35. In the event of any space between the extrusion 18 and the portion 36 of the truck body on which it is installed, sealing means (not shown) may be used to prevent fluid movement through this space.

As stated earlier, the opening spanning portion 22 of the sheet material 19 may be installed either loosely or tightly. Where the container that is sealed is transported up mountains such as at 34 and then down into the valley below under changing atmospheric conditions, it is preferred that the seal be loosely installed so that it can react as a diaphragm to differences between internal and atmospheric pressure without danger of bursting the sheet material.

The first socket means 26 and the adjacent surface of the corresponding shoulder 30 are rounded so as to provide considerable surface contact between the flexible sheet material 19 and the surfaces. This contact provides considerable friction surfaces to aid in retaining the sheet in position. The inclined surface 32 leading to the opposite socket 27 beneath the corresponding shoulder 31 not only provides the mechanical advantage for transversely bending the retaining strip 23 but also automatically causes tightening of the sheet material around the bottom surface of the strip 23 as the strip is forced into position. This is readily apparent by comparing the loose arrangement of the sheet portion 25 in FIGURE 5 with the tight arrangement of the installed sheet and strip in FIGURE 4.

In the preferred construction as shown in the drawings the outer socket 27 is at a lower level than the inner socket 26 so that the locking strip 23 is at an upwardly extending angle to the plane of the portion 22 of the sheet material 19. Because of this angle the locking strip 23 is more firmly wedged in position and more firmly binds the sheet material portion 25 in the socket 27 and beneath the shoulder 31. These features therefore contribute toward holding the sheet material 19 securely throughout the storage period. Then, when the interior 15 of the container 12 is opened it is merely necessary to tear the disposable sheet material 19 in order to provide access. Then, before again sealing the opening 16 or, if desired, immediately upon tearing open the sheet 19 the sealing strip 23 is removed from its groove recess 20 and discarded as it, being plastic, is also disposable. Because they are inexpensive disposable materials, a new sheet 19 and a new sealing strip 23 may economically be used each time the access opening 16 is sealed.

Having described our invention as related to the embodiment shown in the accompanying drawings, it is our intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. Apparatus, comprising: a container providing an enclosing space; means forming an access opening to said space bounded by a peripheral surface member; a closure means for said opening comprising a flexible sheet material normally extending across said opening and having an edge portion at said peripheral surface member; means forming an elongated recess in a surface of said peripheral surface member that is accessible to said opening, said sheet material edge portion being normally located in said recess outwardly of an opening spanning portion of said sheet material extending across said opening; and an elongated generally flat strip locking means located in said recess expansible laterally for locking said sheet material edge portion against said recess means at two laterally spaced areas in said recess, said recess being provided with a pair of elongated, laterally spaced socket means into which said locking means strip presses said two spaced areas of said sheet material edge portion, said spaced socket means being each defined on its outer extremity by an overhanging shoulder located outwardly of said locking means over each of which shoulder said sheet material passes, the sheet material portion at said shoulder more remote from said opening spanning portion being thereby exposed on the exterior of said recess for ready removal of said locking means from said recess by force on said remote sheet material portion.

2. The apparatus of claim 1 wherein said locking means strip is at approximately a right angle to said opening spanning portion of said flexible sheet material for security of locking said spanning portion in spanning position and for ease of said removal.

References Cited

UNITED STATES PATENTS

| | | | |
|---|---|---|---|
| 2,840,158 | 6/1958 | Lee | 160—327 |
| 3,103,083 | 9/1963 | Seeger | 220—24 |
| 3,127,695 | 4/1964 | Driscoll et al. | 160—397 |
| 3,225,407 | 12/1965 | Daniels | 160—392 |

JAMES B. MARBERT, *Primary Examiner.*